July 28, 1931.  F. C. BIGGERT, JR  1,816,464
MEANS FOR GAUGING MATERIAL
Filed Oct. 28, 1927
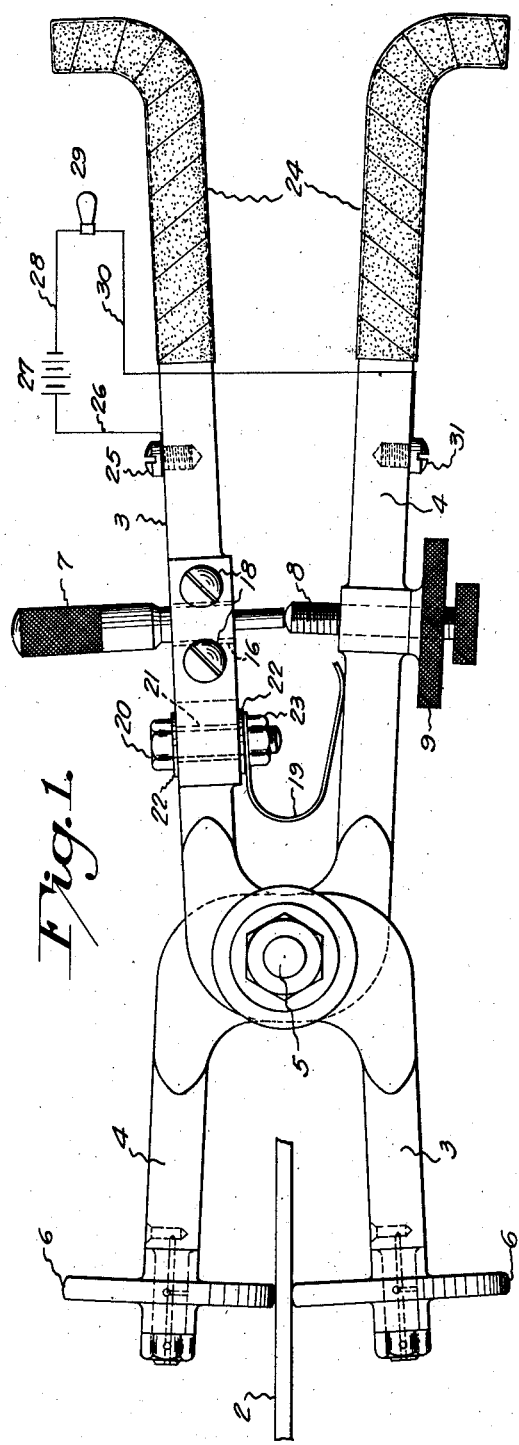
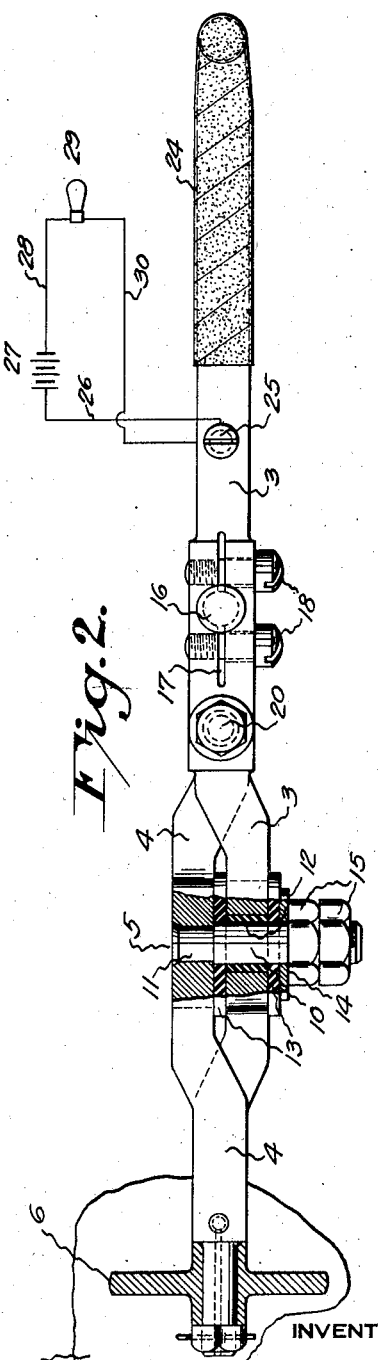
INVENTOR
Florence C. Biggert Jr.
by Byrnes, Stebbins & Parmelee
his attorneys Patented July 28, 1931

1,816,464

UNITED STATES PATENT OFFICE

FLORENCE C. BIGGERT, JR., OF CRAFTON, PENNSYLVANIA, ASSIGNOR TO UNITED ENGINEERING & FOUNDRY COMPANY, OF PITTSBURGH, PENNSYLVANIA, A CORPORATION OF PENNSYLVANIA

MEANS FOR GAUGING MATERIAL

Application filed October 28, 1927. Serial No. 229,406.

This invention relates to a method and means for gauging material, and more particularly to such a method and means for use with moving material such as the strips in rolling mills and other material in lengths adapted to be moved past a given point.

The invention will be described as applied to the gauging of a metal strip in a rolling mill, although it is to be distinctly understood that the same is not limited to such an application nor to the specific form of apparatus shown in the drawings, but may be otherwise variously embodied and practiced within the scope of the claims appended hereto.

In rolling mills it is important that the material being rolled shall be of a substantially uniform thickness throughout, and the material must consequently be gauged at frequent intervals. This gauging is customarily done by hand by the use of a gauge comprising a forked member one arm of which is provided with an adjustable gauging means adapted to be moved toward and away from the material. Due to the high speed of the moving strip, it has heretofore been found necessary to stop the movement of the strip for the gauging operation when the forked gauge is used. The gauge is screwed down onto the strip until it makes firm contact on both sides thereof and then it is pulled off and the reading taken. This procedure has a number of inherent disadvantages in that the strip must be stopped for gauging, the gauge must be screwed down to contact with the strip only at one localized point and the gauge must be withdrawn by pulling it over the more or less rough surface of the strip in order to take the gauge reading.

Thus it is difficult to get an accurate reading, for in withdrawing the gauge its adjustment is very likely to be interfered with. Furthermore, the operator has no means of determining whether the gauge is in proper gauging relationship to the material other than the "feel" of the gauge, which is at best uncertain.

The invention contemplates a method and means for gauging material whereby moving material may be easily and accurately gauged without the necessity of its being stopped, the gauge may be easily brought into and out of gauging relationship with the material, an indication is made at a point remote from the material as to whether the gauging members are in proper gauging relationship with the material, and the gauge may be withdrawn without disturbing its adjustment. To this end I provide a gauge having material engaging members formed with anti-friction means so that the gauge may be brought into the requisite contact with the moving material and at the same time itself remain stationary and give an accurate reading. The material engaging members are preferably pivoted so that they may be closed and opened relatively to the material and are provided with cooperating gauging means whose adjustment is not affected by opening and closing of the pivoted members. In order that the operator may always be sure of taking the reading when the gauging members are in proper gauging relationship with the material, means are provided for indicating when such relationship is established.

In the accompanying drawings I have shown a present preferred embodiment of the invention, wherein Fig. 1 is a plan view of a gauge; and Fig. 2 is a side elevation, partly in cross section, of the gauge shown in Fig. 1.

Referring more particularly to the drawings, reference numeral 2 designates generally a material the thickness of which is to be gauged. The gauge comprises a pair of levers 3 and 4 which are insulated from one another and pivoted together at 5. Each of the levers 3 and 4 has journaled in one of its extremities an anti-friction gauging member or wheel 6. These gauge wheels are adapted to rotate about axes extending generally in the direction of the lengths of the respective levers, and contact with the surfaces of the material at substantially opposite points so that the distance between the gauge wheels is the measure of the thickness of the material.

The lever 3 is provided with a micrometer 7 at a point opposite the pivot 5 from its gauge wheel 6. Adapted to cooperate with the micrometer and disposed in a suitable threaded hub in the lever 4 is a contact screw 8 surrounded by a threaded lock nut 9. The contact screw 8 may be adjusted in any desired position and maintained in such adjusted position by tightening the lock nut 9. The end surface of the micrometer 7 contacts with the end surface of the contact screw 8, the micrometer being set so that its reading when in contact with the screw 8 represents the distance between the gauge wheels 6. The micrometer reading is, therefore, set at zero when the gauge wheels are in contact with each other. As the gauge wheels recede from each other it will be seen that if the micrometer is maintained in contact with the screw 8, its reading will increase.

The distance from the point of contact of the gauge wheels 6 to the pivot 5 may be made the same as the distance from the point of contact of the micrometer 7 and the screw 8 to the pivot 5. In this case an increment of the micrometer reading will be equal to a corresponding increment of the distance of separation of the gauge wheels 6. If the lever arms on opposite sides of the pivot 5 are not the same length, the micrometer must be graduated to take into acount the difference in the lengths of the lever arms if a direct reading is to be obtained.

The insulated connection betwen the levers 3 and 4 is shown in cross section in Fig. 2. The pivot pin 5 has a portion 10 of a relatively large diameter and a portion 11 of a relatively small diameter. Surrounding the portion 10 is a collar 12 of insulating material. The outside diameter of this collar is such that it fits within a suitable hole drilled in the lever 3 so that the collar is interposed between the lever and the pivot pin. Disposed on the pivot pin at both sides of the lever 3 are similar insulating washers 13 which cooperate with the collar 12 to insure complete insulation of the pin 5 from the lever 3, and also to insure insulation between the respective levers 3 and 4. A hole is drilled in the lever 4 of a size suitable to receive the portion 11 of the pin. The pin may be provided with a head or may be riveted to the lever 4 at one end and may be provided with a suitable metal washer 14 and nuts 15 at the other end.

The micrometer 7 is mounted in the lever 3 by means of a construction such as that shown wherein an insulating collar 16 surrounding a portion of the stem of the micrometer insulates the latter from the lever. The lever is slotted at 17 so that the micrometer may be easily inserted and the lever is tightened about the stem of the micrometer by means of bolts 18. A spring 19 is provided for creating a tendency for the gauge to remain in open position so that when gripped with the hand a slight resistance to closing it upon the material will be offered. The spring 19 is secured to the lever 3 by means of a bolt 20 mounted in an insulating collar 21, insulating washers 22 and a nut 23. If the spring 19 is made of metal, therefore, it will not establish an electrical contact with the lever 3.

The handles of the levers are insulated by any suitable material such as tape 24 so that when the tool is grasped by the operator, his hands will be insulated from it. Thus there is provided a pair of pivoted gauge levers entirely insulated one from the other throughout so that no electrical contact is established therebetween.

The lever 3 is provided with a connecting screw 25 which connects to it an electrical conductor or wire 26, such wire in turn leading to one terminal of a suitable dry cell battery 27. The opposite terminal of the battery is connected by a conductor 28 to a lamp 29, and the lamp is in turn connected by a conductor 30 to a connecting screw 31 in the lever 4. The battery 27 is preferably of such a size as to conveniently fit into a man's pocket and the lamp 29 may be provided with a support to hang about the operator's neck or be in some way attached to his person.

When a connection is made between the two gauge wheels 6, as will be the case when the wheels are in contact with opposite sides of a material which conducts electricity, a circuit is closed from the battery through the lever 3, the material 2, and lever 4, the lamp 29 and back to the battery. The closing of the circuit will cause the lamp to light.

In operation the operator places the gauge over the edge of a moving strip of material in such a manner that one of the gauge wheels 6, which may conveniently be that which is uppermost, is in contact with the upper surface of the strip 2. At such time the micrometer will be screwed down so that when the handles are squeezed together the micrometer and the contact screw 8 prevent the lower gauge wheel from touching the under side of the strip. While squeezing the handles the operator then turns the micrometer screw so that the lower gauge wheel gradually rises until it just touches the under surface of the strip, as above described, and the lamp is lit. The illumination of the lamp is a signal to the operator that the gauge is set at the correct reading for the thickness of the strip. It will be understood that a bell or other suitable indicating means may be used in place of the lamp 29.

After the micrometer has been set to indicate the thickness of the strip, the operator may release the handles and withdraw the gauge to read the micrometer without disturbing its adjustment. Furthermore, the operator, by reason of the indicating light 29, knows exactly when the gauge is set to the correct thickness of the strip. The gauge is, therefore, to a great extent foolproof and adapted to quite accurately determine the thickness of the material with very little trouble or effort on the part of the operator.

I claim:

1. In a gauge, a pair of pivoted members insulated from each other and provided with means for engaging a material to be gauged, and means providing with the material an electric circuit adapted to be closed upon contact of the engaging means with the material to indicate that the gauge is in gauging contact with the material.

2. In a gauge, a pair of members connected together by a pivot insulated from one of the members and having means for engaging material to be gauged, and means providing an electric circuit through the members and the material and adapted to be closed upon engagement of such gauging means with the material to be gauged.

3. In a gauge, a pair of members, a pivot connecting them, an insulating collar surrounding the pivot and interposed between it and one of such members, and a pair of insulating washers surrounding the pivot and engaging with the sides of the same member, whereby the two members are pivotally connected yet insulated from each other.

4. In combination, a pair of levers insulated from each other having means for engaging material to be gauged, and means forming with the material an electrical circuit including a source of electrical energy, indicating means and the two insulated levers, whereby the indicating means will be operated upon contact of the engaging means with the material provided the latter be an electric conductor.

5. In a gauge, a pair of pivoted members insulated from each other and provided with means for engaging a material to be gauged, means providing with the material an electric circuit adapted to be closed upon contact of the engaging means with the material to indicate that the gauge is in gauging contact with the material, and indicating means for determining a dimension of said material.

6. In a gauge, a pair of pivoted members insulated from each other and provided with rollers for engaging a material to be gauged, and means providing with the material an electric circuit adapted to be closed upon contact of said rollers with the material to indicate that the gauge is in gauging contact with the material, and indicating means for determining a dimension of said material.

7. In a gauge, a pair of pivoted members insulated from each other and provided with means for engaging a material to be gauged, and means providing with the material an electric circuit adapted to be closed upon contact of the engaging means with the material to indicate that the gauge is in gauging contact with the material, indicating means for determining a dimension of said material, and means for compensating for wear of said engaging means so that said indicating means can always be made to function correctly.

In testimony whereof I have hereunto set my hand.

FLORENCE C. BIGGERT, Jr.